US012660859B2

(12) United States Patent
Kim et al.

(10) Patent No.: US 12,660,859 B2

(45) Date of Patent: Jun. 23, 2026

(54) AEROSOL GENERATING DEVICE

(71) Applicant: KT&G CORPORATION, Daejeon (KR)

(72) Inventors: Yong Hwan Kim, Anyang-si (KR); Sung Wook Yoon, Suwon-si (KR); Seung Won Lee, Gwangmyeong-si (KR); Seok Su Jang, Daejeon (KR); Dae Nam Han, Seoul (KR)

(73) Assignee: KT&G Corporation, Daejeon (KR)

( * ) Notice: Subject to any disclaimer, the term of this patent is extended or adjusted under 35 U.S.C. 154(b) by 545 days.

(21) Appl. No.: 18/026,225

(22) PCT Filed: Dec. 21, 2021

(86) PCT No.: PCT/KR2021/019482

§ 371 (c)(1),
(2) Date: Mar. 14, 2023

(87) PCT Pub. No.: WO2022/145852

PCT Pub. Date: Jul. 7, 2022

(65) Prior Publication Data

US 2023/0354916 A1 Nov. 9, 2023

(30) Foreign Application Priority Data

Dec. 31, 2020 (KR) ........................ 10-2020-0189858

(51) Int. Cl.

*A24F 40/57* (2020.01)
*A24F 40/20* (2020.01)
(Continued)

(52) U.S. Cl.

CPC .............. *A24F 40/57* (2020.01); *A24F 40/20* (2020.01); *A24F 40/465* (2020.01); *A24F 40/51* (2020.01); *H05B 6/06* (2013.01); *H05B 6/108* (2013.01)

(58) Field of Classification Search

CPC ............................... A24F 40/465; A24F 40/57
See application file for complete search history.

(56) References Cited

U.S. PATENT DOCUMENTS 791,765 A 6/1905 French
11,116,256 B1 * 9/2021 Fujita ...................... A24F 40/53
(Continued)

FOREIGN PATENT DOCUMENTS

CN 210329346 U 4/2020
CN 111918571 A 11/2020
(Continued)

OTHER PUBLICATIONS

Extended European Search Report dated Jan. 30, 2024 in Application No. 21915650.2.

(Continued)

*Primary Examiner* — Russell E Sparks

(74) *Attorney, Agent, or Firm* — Foley & Lardner LLP

(57) ABSTRACT

An aerosol generating device includes: a heater configured to heat an aerosol generating article; a temperature sensor configured to measure a temperature of the heater; and a processor configured to: obtain an initial temperature of the heater which is measured by the temperature sensor when a user input for starting an heating operation of the heater is received, compare the initial temperature of the heater with a first temperature; based on the initial temperature being lower than the first temperature, control the heater to perform the heating operation according to a preset temperature profile; and when the temperature of the heater reaches a second temperature higher than the first temperature, control the heater to stop the heating operation for a first delay time.

7 Claims, 10 Drawing Sheets

(51) Int. Cl.

| | |
|---|---|
| ***A24F 40/465*** | (2020.01) |
| ***A24F 40/51*** | (2020.01) |
| ***H05B 6/06*** | (2006.01) |
| ***H05B 6/10*** | (2006.01) |

(56) References Cited

U.S. PATENT DOCUMENTS

| | | | |
|---|---|---|---|
| 11,134,721 | B2 | 10/2021 | Marubashi et al. |
| 11,212,881 | B2 * | 12/2021 | Fursa .................... A24F 40/465 |
| 2007/0074734 | A1 | 4/2007 | Braunshteyn et al. |
| 2015/0122274 | A1 * | 5/2015 | Cohen ..................... A24F 40/40 131/328 |
| 2015/0313284 | A1 | 11/2015 | Liu |
| 2016/0174610 | A1 | 6/2016 | Kuczaj |
| 2017/0055583 | A1 | 3/2017 | Blandino et al. |
| 2018/0132529 | A1 | 5/2018 | Sur et al. |
| 2019/0246699 | A1 | 8/2019 | Qiu |
| 2019/0342950 | A1 | 11/2019 | Bernauer et al. |
| 2020/0154773 | A1 | 5/2020 | Lim et al. |
| 2020/0241058 | A1 * | 7/2020 | Qiu ...................... H05B 1/0227 |
| 2020/0305512 | A1 | 10/2020 | Lim et al. |
| 2020/0329776 | A1 | 10/2020 | Lee |
| 2020/0367569 | A1 | 11/2020 | Farine |
| 2021/0235770 | A1 | 8/2021 | Uthurry |
| 2021/0251299 | A1 | 8/2021 | Seo et al. |
| 2021/0298364 | A1 | 9/2021 | Yu et al. |
| 2022/0095692 | A1 | 3/2022 | Ferrie et al. |
| 2022/0142249 | A1 | 5/2022 | Lim et al. |
| 2022/0369714 | A1 * | 11/2022 | Butin .................... A24F 40/465 |

FOREIGN PATENT DOCUMENTS

| | | | |
|---|---|---|---|
| CN | 112056634 | A | 12/2020 |
| EP | 3 249 488 | A1 | 11/2017 |
| EP | 3 571 941 | A1 | 11/2019 |
| EP | 3 632 240 | A1 | 4/2020 |
| EP | 3 871 527 | A1 | 9/2021 |
| JP | 6728509 | B1 | 7/2020 |
| KR | 10-1314895 | B1 | 10/2013 |
| KR | 10-2017-0107518 | A | 9/2017 |
| KR | 10-2017-0137066 | A | 12/2017 |
| KR | 10-2018-0124739 | A | 11/2018 |
| KR | 10-2019-0078647 | A | 7/2019 |
| KR | 10-2020-0078410 | A | 7/2020 |
| WO | WO-2019/192226 | A1 | 10/2019 |
| WO | WO-2020/009412 | A1 | 1/2020 |
| WO | WO-2020/029923 | A1 | 2/2020 |
| WO | WO-2020/084775 | A1 | 4/2020 |
| WO | WO-2020/193207 | A1 | 10/2020 |

OTHER PUBLICATIONS

Notice of Allowance for Korean Patent Application No. 10-2020-0189858 dated Jan. 13, 2023.

Non-Final Office Action for Korean Patent Application No. 10-2020-0189858 dated Nov. 1, 2022.

Written Opinion for PCT/KR2021/019482 dated Apr. 5, 2022.

International Search Report for PCT/KR2021/019482 dated Apr. 5, 2022.

Chinese Office Action on CN Patent Application No. 202180069420.3 dated Oct. 23, 2025.

* cited by examiner

AEROSOL GENERATING DEVICE

This Application is a National Stage of International Application No. PCT/KR2021/019482 filed Dec. 21, 2021, claiming priority based on Korean Patent Application No. 10-2020-0189858 filed Dec. 31, 2020.

TECHNICAL FIELD

The present disclosure relates to an aerosol generating device.

BACKGROUND ART

Recently, the demand for alternative methods to overcome the disadvantages of traditional aerosol generating articles has increased. For example, there is growing demand for an aerosol generating device which generates an aerosol by heating an aerosol generating material contained in an aerosol generating article (e.g., cigarette) without combustion. Accordingly, researches on a heating-type aerosol generating device has been actively conducted. In particular, research is being conducted to provide a uniform smoking experience for users in different environments.

DISCLOSURE

Technical Problem

When an aerosol generating device is used in different environments or when a different aerosol generating article is used, a change in temperature of a heater may be different, even if power is supplied according to the same profile. As a result, a deviation occurs in a preheating time, and thus a non-uniform smoking experience may be provided to a user. Therefore, it is necessary to reduce a deviation in the preheating time to provide a uniform smoking experience to the user.

Technical problems to be solved by the present disclosure are not limited to those described above, and other technical problems may be inferred from the following embodiments.

Technical Solution

According to one or more embodiments, an aerosol generating device includes a heater configured to heat an aerosol generating article, a temperature sensor configured to measure a temperature of the heater, and a processor configured to: obtain an initial temperature of the heater which is measured by the temperature sensor when a user input for starting an heating operation of the heater is received; compare the initial temperature of the heater with a first temperature; based on the initial temperature being lower than the first temperature, control the heater to perform the heating operation according to a preset temperature profile; and when the temperature of the heater reaches a second temperature higher than the first temperature, control the heater to stop the heating operation for a first delay time.

Advantageous Effects

An aerosol generating device may provide a uniform smoking experience to a user by minimizing a deviation in preheating time in different environments by performing a heating operation based on an initial temperature of a heater. In addition, when an aerosol generating article is inserted, the aerosol generating device may perform a heating operation for minimizing the deviation in the preheating time without an external input by the user.

The effects of the present disclosure are not limited to the effect described above, and unmentioned effects will be clearly understood by one of ordinary skill in the art from the present specification and the accompanying drawings.

BEST MODE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
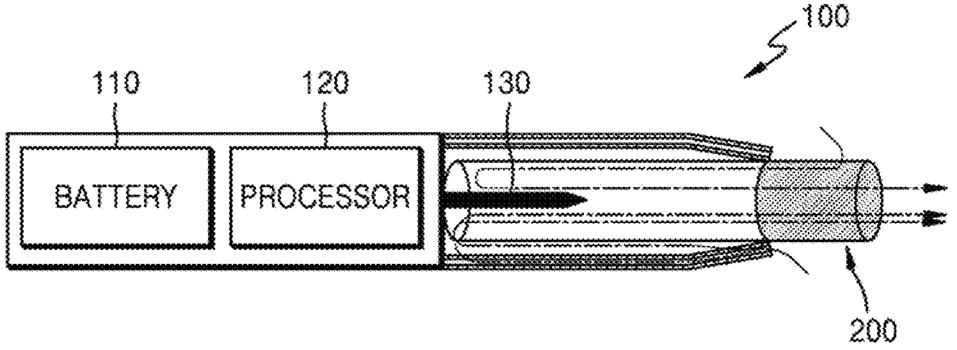
FIGS. 1 through 3 are views showing examples in which an aerosol generating article is inserted into an aerosol generating device.
Figure 2:
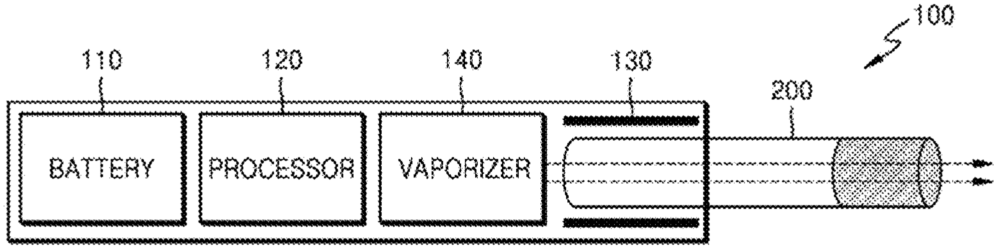
Figure 3:
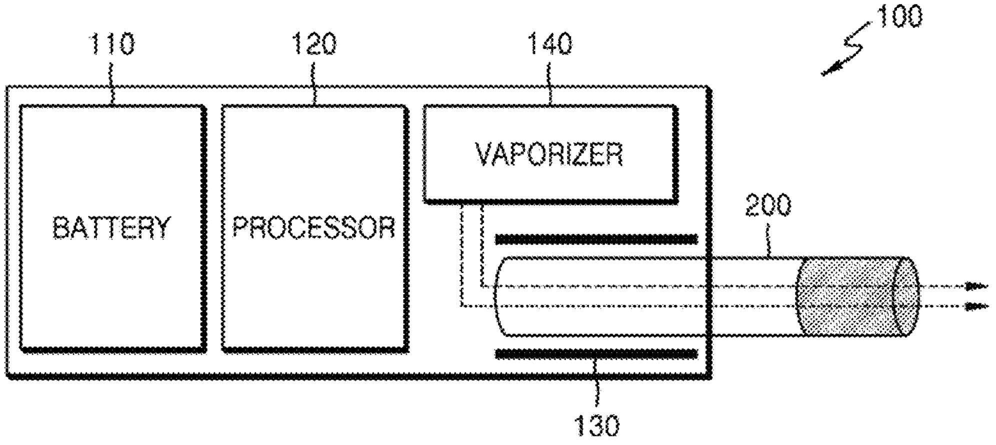

FIGS. 1 through 3 are diagrams showing examples in which an aerosol generating article is inserted into an aerosol generating device.

Referring to FIG. 1, the aerosol generating device 100 may include a battery 110, a processor 120, and a heater 130.

Referring to FIGS. 2 and 3, the aerosol generating device 100 may further include a vaporizer 140. Also, the aerosol generating article 200 may be inserted into an inner space of the aerosol generating device 100.

FIGS. 1 through 3 illustrate components of the aerosol generating device 100, which are related to the present embodiment. Therefore, it will be understood by one of ordinary skill in the art related to the present embodiment that other general-purpose components may be further included in the aerosol generating device 100, in addition to the components illustrated in FIGS. 1 through 3.

Also, FIGS. 2 and 3 illustrate that the aerosol generating device 100 includes the heater 130. However, as necessary, the heater 130 may be omitted.

FIG. 1 illustrates that the battery 110, the processor 120, and the heater 130 are arranged in series. Also, FIG. 2 illustrates that the battery 110, the processor 120, the vaporizer 140, and the heater 130 are arranged in series. Also, FIG. 3 illustrates that the vaporizer 140 and the heater 130 are arranged in parallel. However, the internal structure of the aerosol generating device 100 is not limited to the structures illustrated in FIGS. 1 through 3. In other words, according to the design of the aerosol generating device 100, the battery 110, the processor 120, the heater 130, and the vaporizer 140 may be differently arranged.

When the aerosol generating article 200 is inserted into the aerosol generating device 100, the aerosol generating device 100 may operate the heater 130 and/or the vaporizer 140 to generate aerosol from the aerosol generating article 200 and/or the vaporizer 140. The aerosol generated by the heater 130 and/or the vaporizer 140 is delivered to a user by passing through the aerosol generating article 200.

As necessary, even when the aerosol generating article 200 is not inserted into the aerosol generating device 100, the aerosol generating device 100 may heat the heater 130.

The battery 110 may supply power to be used for the aerosol generating device 100 to operate. For example, the battery 110 may supply power to heat the heater 130 or the vaporizer 140, and may supply power for operating the processor 120. Also, the battery 110 may supply power for operations of a display, a sensor, a motor, etc. mounted in the aerosol generating device 100.

The processor 120 may generally control operations of the aerosol generating device 100. In detail, the processor 120 may control not only operations of the battery 110, the heater 130, and the vaporizer 140, but also operations of other components included in the aerosol generating device 100. Also, the processor 120 may check a state of each of the components of the aerosol generating device 100 to determine whether or not the aerosol generating device 100 is able to operate.

A processor 120 can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 may be heated by the power supplied from the battery 110. For example, when the aerosol generating article 200 is inserted into the aerosol generating device 100, the heater 130 may be located outside the aerosol generating article 200. Thus, the heated heater 130 may increase a temperature of an aerosol generating material in the aerosol generating article 200.

The heater 130 may include an electro-resistive heater. For example, the heater 130 may include an electrically conductive track, and the heater 130 may be heated when currents flow through the electrically conductive track. However, the heater 130 is not limited to the example described above and may include all heaters which may be heated to a desired temperature. Here, the desired temperature may be pre-set in the aerosol generating device 100 or may be set as a temperature desired by a user.

As another example, the heater 130 may include an induction heater. In detail, the heater 130 may include an electrically conductive coil for heating an aerosol generating article in an induction heating method, and the aerosol generating article may include a susceptor which may be heated by the induction heater.

For example, the heater 130 may include a tube-type heating element, a plate-type heating element, a needle-type heating element, or a rod-type heating element, and may heat the inside or the outside of the aerosol generating article 200, according to the shape of the heating element.

Also, the aerosol generating device 100 may include a plurality of heaters 130. Here, the plurality of heaters 130 may be inserted into the aerosol generating article 200 or may be arranged outside the aerosol generating article 200. Also, some of the plurality of heaters 130 may be inserted into the aerosol generating article 200 and the others may be arranged outside the aerosol generating article 200. In addition, the shape of the heater 130 is not limited to the shapes illustrated in FIGS. 1 through 3 and may include various shapes.

The vaporizer 140 may generate aerosol by heating a liquid composition and the generated aerosol may pass through the aerosol generating article 200 to be delivered to a user. In other words, the aerosol generated via the vaporizer 140 may move along an air flow passage of the aerosol generating device 100 and the air flow passage may be configured such that the aerosol generated via the vaporizer 140 passes through the aerosol generating article 200 to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 140 may be referred to as a cartomizer or an atomizer, but it is not limited thereto.

The aerosol generating device 100 may further include general-purpose components in addition to the battery 110, the processor 120, the heater 130, and the vaporizer 140. For example, the aerosol generating device 100 may include a display capable of outputting visual information and/or a motor for outputting haptic information. Also, the aerosol generating device 100 may include at least one sensor (a puff sensor, a temperature sensor, an aerosol generating article insertion detecting sensor, etc.). Also, the aerosol generating device 100 may be formed as a structure that, even when the aerosol generating article 200 is inserted into the aerosol generating device 100, may introduce external air or discharge internal air.

Although not illustrated in FIGS. 1 through 3, the aerosol generating device 100 and an additional cradle may form together a system. For example, the cradle may be used to charge the battery 110 of the aerosol generating device 100. Alternatively, the heater 130 may be heated when the cradle and the aerosol generating device 100 are coupled to each other.

The aerosol generating article 200 may be similar to a general combustive cigarette. For example, the aerosol generating article 200 may be divided into a first portion including an aerosol generating material and a second portion including a filter, etc. Alternatively, the second portion of the aerosol generating article 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, the opening and closing and/or a size of the air passage formed in the aerosol generating device 100 may be adjusted by the user. Accordingly, the amount of smoke and a smoking impression may be adjusted by the user. As another example, the external air may flow into the aerosol generating article 200 through at least one hole formed in a surface of the aerosol generating article 200.

Figure 4:
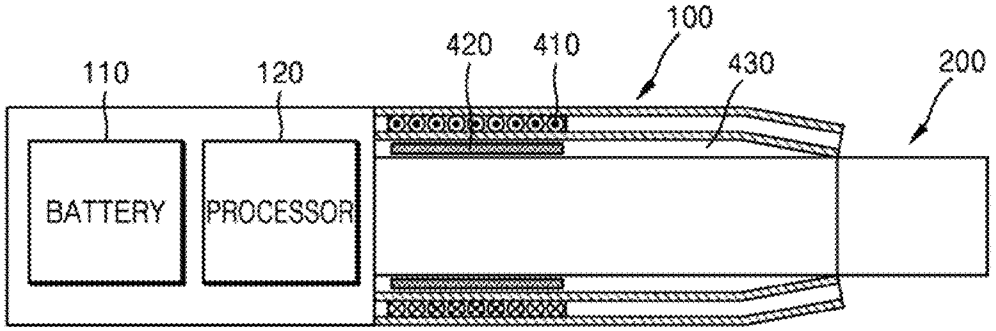
FIG. 4 is a view illustrating an example of an aerosol generating device by using an induction heating method.

FIG. 4 is a view illustrating an example of an aerosol generating device which employs an induction heating method.

Referring to FIG. 4, an aerosol generating device 100 may include the battery 110, the processor 120, the coil 410, and a susceptor 420. In addition, at least part of the aerosol generating article 200 may be accommodated in a cavity 430 of the aerosol generating device 100. The aerosol generating article 200, the battery 110, and the processor 120 of FIG. 4 may respectively correspond to the aerosol generating article 200, the battery 110, and the processor 120 of FIGS. 1 to 3. In addition, the coil 410 and the susceptor 420 of FIG. 4 may be included in the heater 130 of FIGS. 1 to 3. Accordingly, redundant descriptions thereof are omitted.

FIG. 4 illustrates the aerosol generating device 100 including components relating to the present embodiment. Therefore, it would be understood by one of ordinary skill in the art that the aerosol generating device 100 may further include other general-purpose components in addition to the components shown in FIG. 4.

The coil 410 may be wound around the cavity 430. FIG. 4 illustrates that the coil 410 surrounds the cavity 430, but the present disclosure is not limited thereto.

When the aerosol generating article 200 is accommodated in the cavity 430 of the aerosol generating device 100, the aerosol generating device 100 may supply power to the coil 410 so that the coil 410 generates a variable magnetic field. The susceptor 420 may be heated as the magnetic field generated by the coil 410 passes through the susceptor 420.

For example, when a magnetic induction in the susceptor 420 changes, an electric field is generated in the susceptor 420, and thereby an eddy current flows in the susceptor 420. The eddy current generates heat proportional to current density and conductor resistance in the susceptor 420.

The susceptor 420 is heated by the eddy current and an aerosol generating material in the aerosol generating article 200 is heated by the heated susceptor 420, and thus, an aerosol may be generated. The aerosol generated from the aerosol generating material passes through the aerosol generating article 200 and is delivered to a user.

The battery 110 may supply power for the coil 410 to generate a magnetic field. The processor 120 may be electrically connected to the coil 410.

The coil 410 may be an electrically conductive coil that generates a variable magnetic field by using power supplied from the battery 110. The coil 410 may surround at least part of the cavity 430. The variable magnetic field generated by the coil 410 may be applied to the susceptor 420 arranged at an inner end portion of the cavity 430.

The susceptor 420 is heated as the variable magnetic field generated from the coil 410 penetrates therethrough and may include metal or carbon. For example, the susceptor 420 may include at least one of ferrite, ferromagnetic alloy, stainless steel, and aluminum.

In addition, the susceptor 420 may include at least one of ceramic such as graphite, molybdenum, silicon carbide, niobium, nickel alloy, metal film, or zirconia, a transition metal such as nickel (Ni) or cobalt (Co), and a metalloid such as boron (B) or phosphorus (P). However, the susceptor 420 is not limited to the above-described example and may be made of any material as long as the material may be heated to a desirable temperature as a variable magnetic field is applied thereto. Here, the desired temperature may be pre-set in the aerosol generating device 100 or may be set as a temperature desired by a user.

When the aerosol generating article 200 is accommodated in the cavity 430 of the aerosol generating device 100, the susceptor 420 may surround at least part of the aerosol generating article 200. Therefore, the heated susceptor 420 may increase the temperature of the aerosol generating material in the aerosol generating article 200.

FIG. 4 illustrates that the susceptor 420 surrounds at least part of the aerosol generating article, but the present disclosure is not limited thereto. For example, the susceptor 420 may include a tube-type heating element, a plate-type heating element, a needle-type heating element, or a rod-type heating element, and may heat the inside or the outside of the aerosol generating article 200, according to the shape of the heating element.

Also, the aerosol generating device 100 may include a plurality of susceptors 420. In this case, the plurality of susceptors 420 may also be arranged on the outside of the aerosol generating article 200 or may also be arranged to be inserted thereinto. Also, some of the plurality of susceptors 420 may be inserted into the aerosol generating article 200 and the others may be arranged outside the aerosol generating article 200. In addition, the shape of the susceptor 420 is not limited to the shape illustrated in FIG. 4 and may be changed in various shapes.

Hereinafter, the examples of the aerosol generating article 200 will be described with reference to FIGS. 5 and 6.

Figure 5:
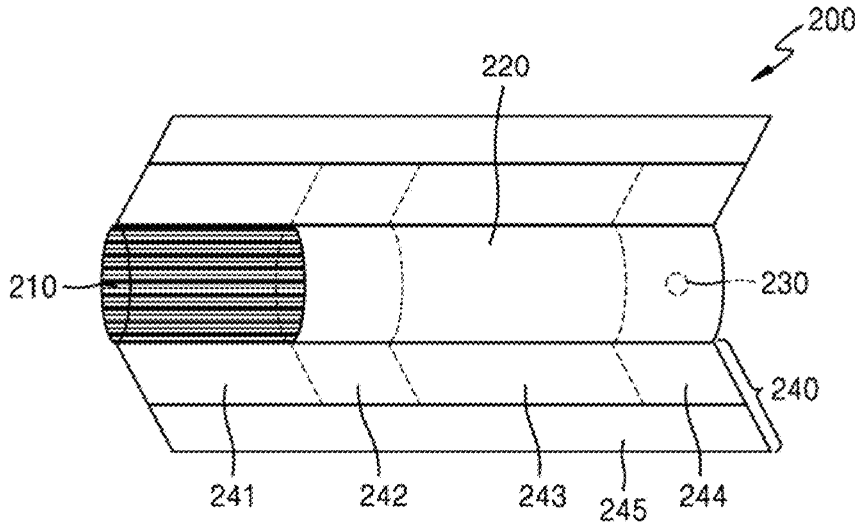
FIGS. 5 and 6 are views showing examples of an aerosol generating article.
Figure 6:
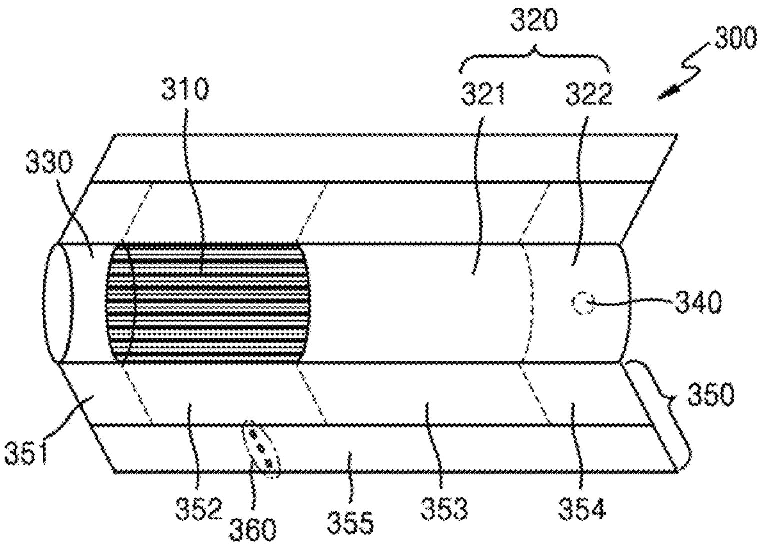

FIGS. 5 and 6 illustrate examples of the aerosol generating article.

Referring to FIG. 5, the aerosol generating article 200 may include a tobacco rod 210 and a filter rod 220. The first portion described above with reference to FIGS. 1 through 3 may include the tobacco rod 210, and the second portion may include the filter rod 220.

FIG. 5 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, as necessary, the filter rod 220 may further include at least one segment configured to perform other functions.

The aerosol generating article 200 may be packaged using at least one wrapper 240. The wrapper 240 may have at least one hole through which external air may be introduced or internal air may be discharged. For example, the aerosol generating article 200 may be packaged by one wrapper 240. As another example, the aerosol generating article 200 may be doubly packaged by two or more wrappers 240. For example, the tobacco rod 210 may be packaged by a first wrapper 241, and the filter rod 220 may be packaged by wrappers 242, 243, 244. Also, the entire aerosol generating article 200 may be re-packaged by another single wrapper 245. When the filter rod 220 includes a plurality of segments, each segment may be packaged by wrappers 242, 243, 244.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Referring to FIG. 6, the aerosol generating article 300 may further include a front-end plug 330. The front-end plug 330 may be located on one side of the tobacco rod 310 which is opposite to the filter rod 320. The front-end plug 330 may prevent the tobacco rod 310 from being detached outwards and prevent the liquefied aerosol from flowing from the tobacco rod 310 into the aerosol generating device (100 of FIGS. 1 through 3), during smoking.

The filter rod 320 may include a first segment 321 and a second segment 322. Here, the first segment 321 may correspond to the first segment of the filter rod 220 of FIG. 5, and the second segment 322 may correspond to the second segment of the filter rod 220 of FIG. 5.

A diameter and a total length of the aerosol generating article 300 may correspond to a diameter and a total length of the aerosol generating article 200 of FIG. 5. For example, the length of the front-end plug 330 is about 7 mm, the length of the tobacco rod 310 is about 15 mm, the length of the first segment 321 is about 12 mm, and the length of the second segment 322 is about 14 mm, but it is not limited thereto.

The aerosol generating article 300 may be packaged using at least one wrapper 350. The wrapper 350 may have at least one hole through which external air may be introduced or internal air may be discharged. For example, the front end plug 330 may be packaged by a first wrapper 351, the tobacco rod 310 may be packaged by a second wrapper 352, the first segment 321 may be packaged by a third wrapper 353, and the second segment 322 may be packaged by a fourth wrapper 354. Further, the entire aerosol generating article 300 may be repackaged by a fifth wrapper 355.

In addition, at least one perforation 360 may be formed in the fifth wrapper 355. For example, the perforation 360 may be formed in a region surrounding the tobacco rod 310, but is not limited thereto. The perforation 360 may serve to transfer heat generated by the heater 130 illustrated in FIGS. 2 and 3 to the inside of the tobacco rod 310.

In addition, at least one capsule 340 may be included in the second segment 322. Here, the capsule 340 may generate a flavor or an aerosol. For example, the capsule 340 may have a configuration in which a liquid containing a flavoring material is wrapped with a film. For example, the capsule 340 may have a spherical or cylindrical shape, but is not limited thereto.

Figure 7:
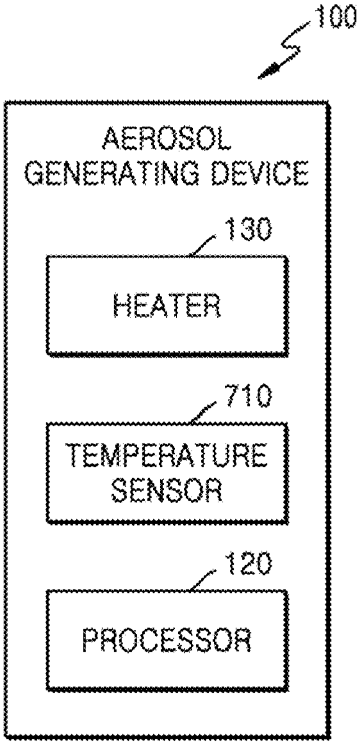
FIG. 7 is a block diagram illustrating a configuration of an aerosol generating device according to an embodiment.

FIG. 7 is a block diagram illustrating a configuration of an aerosol generating device according to an embodiment.

Referring to FIG. 7, the aerosol generating device 100 may include a heater 130, a temperature sensor 710, and a processor 120. The heater 130 of FIG. 7 may correspond to the heater 130, the coil 410, and the susceptor 420 of FIGS. 1 to 4, and the processor 120 of FIG. 7 may correspond to the processor 120 of FIGS. 1 to 4. Accordingly, redundant descriptions thereof are omitted.

FIG. 7 illustrates the aerosol generating device 100 including components relating to the present embodiment. Therefore, it would be understood by one of ordinary skill in the art that the aerosol generating device 100 may further include other general-purpose components in addition to the components shown in FIG. 7.

The heater 130 may heat the aerosol generating article. For example, the heater 130 may heat the aerosol generating article accommodated in the aerosol generating device 100, thereby heating the aerosol generating material contained in the aerosol generating article.

The temperature sensor 710 may be arranged adjacent to the heater 130 to directly or indirectly measure the temperature of the heater 130. For example, the temperature sensor 710 may detect the temperature of the heater 130 and output a voltage corresponding to the detected temperature. Alternatively, the temperature sensor 710 may include a thermistor for outputting a resistance value corresponding to the detected temperature. The processor 120 may determine the temperature of the heater 130 based on the information (e.g., a voltage or resistance value) received from the temperature sensor 710. However, the methods of operating the temperature sensor 710 described above are only examples, and any method may be applied to the temperature sensor 710 as long as the method is for sensing or measuring the temperature.

The processor 120 may respond to a user input. The user input is an input by the user to initiate the heating operation of the aerosol generating device 100, and input methods may vary. For example, the input method may include pressing of a button, touching of a touch screen, insertion of an aerosol generating article, or the like. The input method according to the insertion of the aerosol generating article will be described later. However, this is only an example, and the input method of the user input may include any method in which the aerosol generating device 100 may respond. In response to the user input, the processor 120 may perform a process for the heating operation of the aerosol generating device 100.

The processor 120 may vary the process for the heating operation depending on an initial temperature of the heater 130, which is a temperature when the user input is received. For example, the processor 120 may perform the heating operation immediately when the initial temperature of the heater 130 is close to room temperature, and may perform the heating operation after a certain period of time when the initial temperature of the heater 130 is a temperature in an already-heated state.

In response to the user input, the processor 120 may determine the process for performing the heating operation. The processor 120 may compare the initial temperature of the heater 130 measured by the temperature sensor 710 with a first temperature to determine the process. The first temperature may be set to an appropriate value to determine whether the initial temperature of the heater 130 is close to room temperature or a temperature in a heated state. For example, the first temperature may be about 50° C. to about 80° C.

The processor 120 may perform the heating operation using the heater 130 when the initial temperature of the heater 130 is lower than the first temperature. For example, the processor 120 may perform the heating operation according to a preset temperature profile by using a heater 130. When a second temperature is reached as the heater 130 is heated, the processor 120 may stop the heating operation for a first delay time. The processor 120 may resume the heating operation after the first delay time has passed. An operating method of the aerosol generating device 100 when the initial temperature of the heater 130 is lower than the first temperature is described in detail with reference to FIG. 9.

The processor 120 may not immediately perform the heating operation using the heater 130 when the initial temperature of the heater 130 is higher than or equal to the first temperature, and may perform the heating operation after a second delay time has passed. The processor 120 may determine the second delay time based on the initial temperature of the heater 130. An operating method of the aerosol generating device 100 when the initial temperature of the heater 130 is higher than or equal to the first temperature will be described in detail with reference to FIG. 11.

The aerosol generating device 100 may further comprise a cavity (not shown) for accommodating the aerosol generating article. The cavity may form an accommodating space for accommodating an aerosol generating article in the aerosol generating device 100. The cavity of FIG. 7 may correspond to the cavity 430 of FIG. 4. Accordingly, redundant descriptions thereof are omitted.

In one embodiment, the aerosol generating device 100 may further include an insertion detecting sensor (not shown). The insertion detecting sensor may detect whether the aerosol generating article is inserted into the cavity. For example, the aerosol generating article may include a metal material such as aluminum, and the insertion detecting sensor may include an inductive sensor for sensing a magnetic field change that occurs as the aerosol generating article is inserted into the cavity. However, the present disclosure is not limited thereto, and the insertion detecting sensor may include an optical sensor, a temperature sensor, a resistive sensor, and the like.

In this case, the detection of an aerosol generating article being inserted into the cavity by the insertion detecting sensor may serve as a user input for the heating operation. That is, when insertion of the aerosol generating article is detected, the processor 120 may automatically perform the process for the heating operation without an additional external input.

In another embodiment, the aerosol generating device 100 may further include an identification sensor (not shown) that identifies the type of the aerosol generating article inserted into the cavity based on an identification mark provided the aerosol generating article. For example, the identification mark, which indicates the type of the aerosol generating article, may be a metal material that is printed or attached to a wrapper of the aerosol generating article or is included in the aerosol generating article. Therefore, the identification marks provided on aerosol generating articles of the same type may be the same and the identification marks provided on different types of aerosol generating articles may be different. For example, the identification mark may include a mark representing a particular color, a particular phrase, a bar code, a quick response (QR) code, or a specific metal material, but is not limited thereto.

The identification sensor may recognize the identification mark provided on the aerosol generating article accommodated in the aerosol generating device 100. The identification sensor may recognize the identification mark by detecting the color, pattern, shape, or material of the identification mark. The identification sensor may include an appropriate configuration depending on the type of identification mark. For example, the identification sensor may include an inductive sensor, a color sensor, an optical scanner, a near field communication (NFC) reader, a radio frequency identifier (RFID) reader, or the like depending on the type of the identification mark. The preceding examples are for convenience of explanation, and are not intended to limit the type of the identification sensor. The identification sensor is not limited as long as it is capable of recognizing the identification mark.

When the identification sensor includes the inductive sensor, the identification mark may be a metal material. The identification sensor may identify the type of the aerosol generating article based on the amount of change in inductance detected with the insertion of the aerosol generating article. In this case, the identification sensor may also serve as the insertion detecting sensor.

The processor 120 may determine the first delay time based on the type of the aerosol generating article identified by the identification sensor. The method of determining the first delay time based on the type of the aerosol generating article may be described in detail with reference to FIG. 9.

In another embodiment, the heater 130 may include a coil (not shown) and a susceptor (not shown). The coil may surround the cavity and generate a variable magnetic field. The susceptor may be disposed inside the coil and may be heated by the variable magnetic field. The coil and susceptor of FIG. 7 may correspond to the coil 410 and the susceptor 420 of FIG. 4. Accordingly, redundant descriptions thereof are omitted.

The processor 120 may perform or stop the heating operation by controlling power supplied to the coil. For example, the processor 120 may perform the heating operation by controlling the battery of the aerosol generating device 100 to supply power to the coil, and the heating operation may be stopped by controlling the battery to stop the power supply to the coil. In addition, the processor 120 may resume the heating operation by controlling the battery of the aerosol generating device 100 to supply power to the coil again after the heating operation is stopped for the first delay time. The operation of the coil and the susceptor during the first delay time will be described below with reference to FIG. 9.

Figure 8:
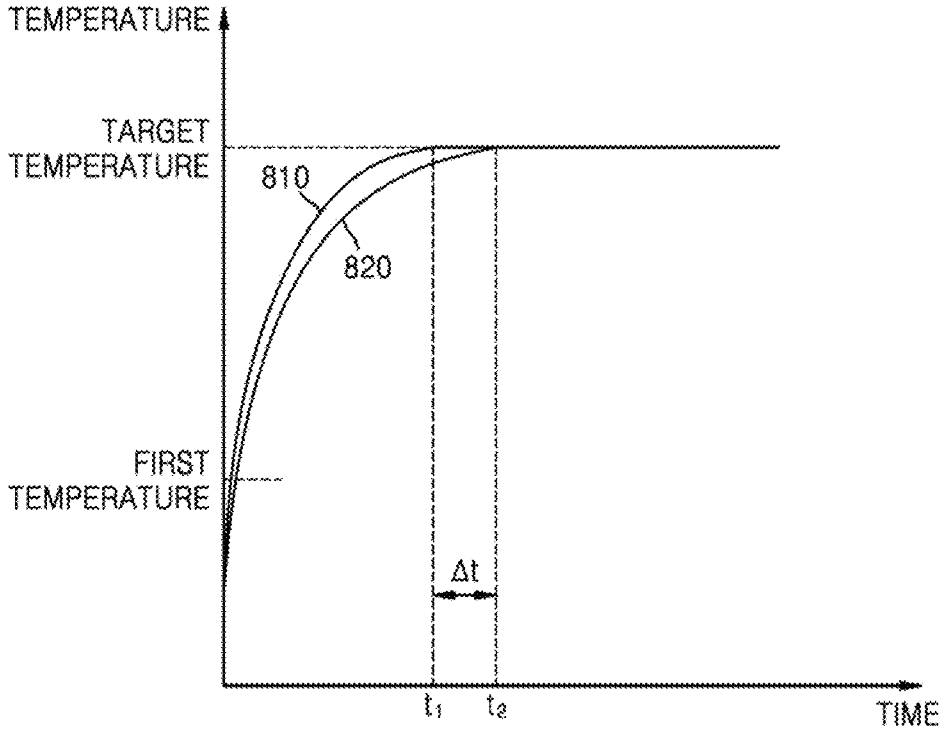
FIG. 8 is a graph illustrating a deviation in a target temperature reaching time when an initial temperature of a heater is lower than a first temperature.

FIG. 8 is a graph illustrating a deviation in the target temperature reaching time when the initial temperature of the heater is lower than the first temperature.

Referring to FIG. 8, a first graph 810 and a second graph 820 are illustrated. The first graph 810 and the second graph 820 show the results of performing the heating operation in different environments by the aerosol generating device. For example, different environments may refer to when an external temperature or humidity of the aerosol generating device is different, or when different types of aerosol generating articles are used. Alternatively, different environments may refer to when different individual cigarettes are used even when they belong to the same type of aerosol generating articles. The target temperature is the temperature when preheating is completed, and thus the time $t_1$ or $t_2$ at which the target temperature is reached may correspond to the time when preheating is completed.

Depending on the type of the aerosol generating article, thicknesses and composition of materials of the wrapper may differ. Further, even in the same type of aerosol generating articles, a deviation in the thickness and composition of materials of the wrapper may occur among individual articles during the manufacturing process. Therefore, even if power is supplied to the heater according to the same profile, the target temperature reaching time may differ according to the type of the aerosol generating article or between individual articles of the same kind. As shown in FIG. 8, there is a difference $\Delta t$ between the target temperature reaching time $t_1$ according to the first graph 810 and the target temperature reaching time $t_2$ according to the second graph 820. For example, in the second graph 820, an aerosol generating article may have a thicker wrapper than an aerosol generating article in the first graph 810.

The processor may perform the heating operation using a proportional-integral-differential (PID) control. The PID control may be performed such that not only the target temperature reaching time but also overshoot is reduced. Therefore, the temperature rises rapidly at first for the heater to reach the target temperature, but the temperature rises slowly as the temperature approaches the target temperature to reduce overshoot. Therefore, as shown in FIG. 8, the time difference between the first graph 810 and the second graph 820 may become larger as the temperature of the heater approaches the target temperature.

As such, when a deviation occurs in the preheating time according to a change in the aerosol generating article or the external environment, a uniform smoking experience may not be provided to the user. However, the aerosol generating device 100 of FIG. 7 may provide a more uniform preheating time (i.e., the target temperature reaching time) regardless of the difference in the aerosol generating article being used or the external environment by applying the first delay time and the second delay time to the heating operation using the heater.

Figure 9:
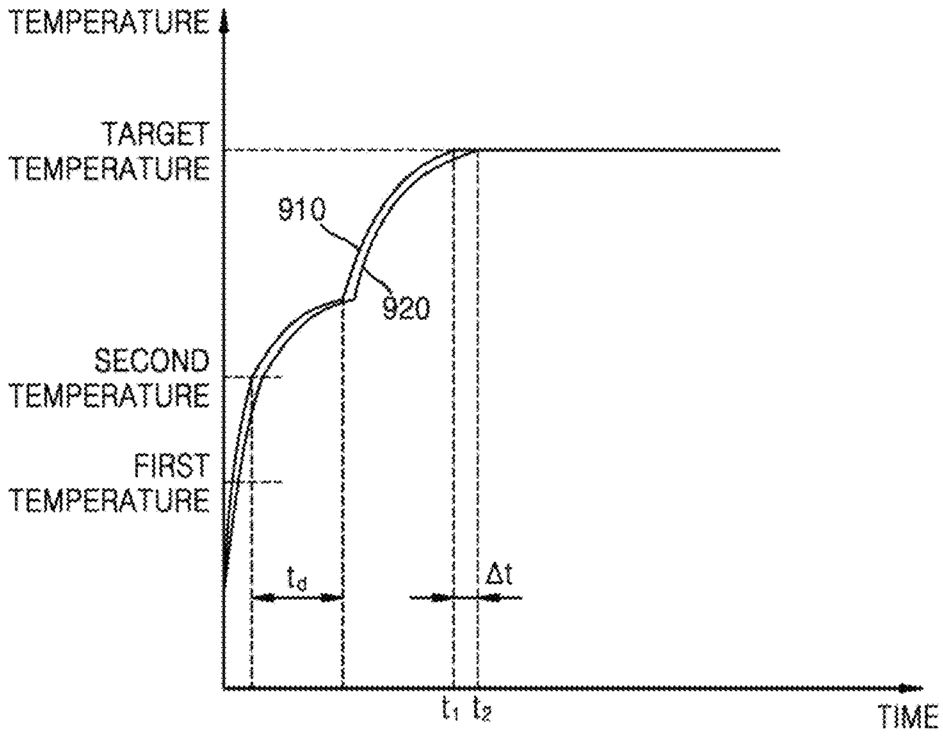
FIG. 9 is a graph illustrating an operating method of an aerosol generating device according to an embodiment when an initial temperature of a heater is lower than a first temperature.

FIG. 9 is a graph illustrating an operating method of the aerosol generating device according to an embodiment when the initial temperature of the heater is lower than the first temperature.

Referring to FIG. 9, a first graph 910 and a second graph 920 are illustrated. The first graph 910 of FIG. 9 shows a result of the heating operation performed in the same environment as in the first graph 810 of FIG. 8, and the second graph 920 of FIG. 9 shows a result of the heating operation performed in the same environment as in the second graph 820 of FIG. 8. For example, the first graph 910 of FIG. 9 and the first graph 810 of FIG. 8 may show results of the heating operation performed with respect to the same aerosol generating article.

As shown in FIG. 9, the processor may perform the heating operation using the heater immediately if the initial temperature of the heater is measured to be less than the first temperature. The processor may stop the heating operation for a first delay time td when the second temperature is reached as the heater is heated.

The second temperature may be set to an appropriate value considering at least one of performance of the heater, power supplied to the heater, the target temperature of the heater, and the target temperature reaching time of the heater. For example, the second temperature may be about 100° C. to about 130° C.

The first delay time td is the time between when the heating operation is stopped and when the heating operation is resumed. The difference Δt between the target temperature reaching times $t_1$ and $t_2$ may vary according to a length of the first delay time td. The first delay time td may be set to an appropriate time such that the difference Δt between the target temperature reaching times $t_1$ and $t_2$ is reduced and the target temperature reaching times $t_1$ and $t_2$ are not significantly increased.

The first delay time may be a time preset during the design process of the manufacturing process of the aerosol generating device. Also, the first delay time may be determined by the processor. For example, the first delay time may be determined based on at least one of performance of the heater, power supplied to the heater, the target temperature of the heater, and the target temperature reaching time of the heater. For example, the first delay time may be set to about 2 seconds to about 5 seconds.

Even if the same first delay time is also applied to the second graph 920 at the second temperature, the difference Δt between the target temperature reaching times may be still reduced compared to the difference Δt of FIG. 8 for at least one of the reasons below.

The wrapper and composition materials may vary among different kinds of aerosol generating articles or among individual articles of the same kind. The difference between the aerosol generating articles may be reduced because the wrappers and materials of the aerosol generating articles are softened during the first delay time after the heater is heated to the second temperature. The processor may reduce the difference Δt between the target temperature reaching times by resuming the heating operation in a state in which the difference between the aerosol generating articles is reduced.

Alternatively, when the heating operation is resumed after the first delay time, according to the PID control, the heating operation may be resumed by performing the same process that is performed when the heating operation starts for the first time. Therefore, when the heating operation is resumed, the temperature of the heater may rapidly rise similarly to when the heating operation is performed at the initial temperature. In this case, because the difference between the second temperature and the target temperature is smaller than the difference between the initial temperature and the target temperature, the heating speed (i.e., temperature increase rate) may begin to decrease at a higher temperature than that in graph 820 in FIG. 8 where the first delay time is not applied. Therefore, the period during which the heating speed is relatively low becomes shortened, and thus the difference Δt between the target temperature reaching times may be reduced.

As shown in FIG. 9, the temperature of the heater may rise even during the first delay time in which the heating operation is stopped (i.e., power supply from the battery to the heater is shut off), only at a slow heating speed compared to when the heating operation is performed. Specifically, the heater may continue to be heated by remaining power which was supplied to the heater but left unconsumed until the heating operation is stopped. Because the temperature of the heater slowly rises even after the heating operation is stopped, the target temperature reaching time may be reduced compared to when the temperature of the heater is maintained or lowered.

In an embodiment where the heater includes the coil and the susceptor (see FIG. 4), the susceptor may continue to conduct heat to the aerosol generating article by a residual eddy current induced from the variable magnetic field during the first delay time after the heating operation is stopped. Even when the power supply to the coil is stopped, a part of the eddy current generated in the susceptor may remain, and thus the heating of the susceptor may continue.

Also, the coil may still generate a variable magnetic field by the power already supplied and remaining. The susceptor may continue to conduct heat to the aerosol generating article by the variable magnetic field generated from the coil due to the remaining power. Because the coil surrounds most areas of the susceptor and is wound several times, when the remaining power is present even after the heating operation is stopped, the heating of the susceptor may be effectively sustained by the variable magnetic field generated by the remaining power. Therefore, when the heater includes the coil and the susceptor, the heating of the susceptor may be effectively sustained during the first delay time after the heating operation is stopped, thereby reducing the target temperature reaching time.

The processor may determine the first delay time through various methods described below. For example, the processor may determine the first delay time based on the time taken for the heater to reach the second temperature from the start of the heating operation. The first delay time may have a negative correlation with the time taken for the temperature of the heater to reach the second temperature. In other words, as the time taken for the temperature of the heater to reach the second temperature becomes longer, the first delay time may be decreased such that the difference between the target temperature reaching times is minimized.

Alternatively, the processor may determine the first delay time based on the initial temperature of the heater. In this case, the first delay time may have a positive correlation with the initial temperature of the heater. In other words, as the initial temperature of the heater become higher, the first delay time may be increased such that the difference between the target temperature reaching times is minimized.

Alternatively, the processor may determine the first delay time based on the type of the aerosol generating article identified by the identification sensor. The memory of the aerosol generating device may store the first delay time corresponding to each aerosol generating article type. The first delay time stored in the memory may be predetermined such that various types of aerosol generating articles have substantially the same target temperature reaching time. For example, the first delay time may be set to be relatively long for an aerosol generating article type that is heated relatively fast. The processor may determine the first delay time corresponding to the type of the identified aerosol generating article from among various first delay times stored in the memory.

Figure 10:
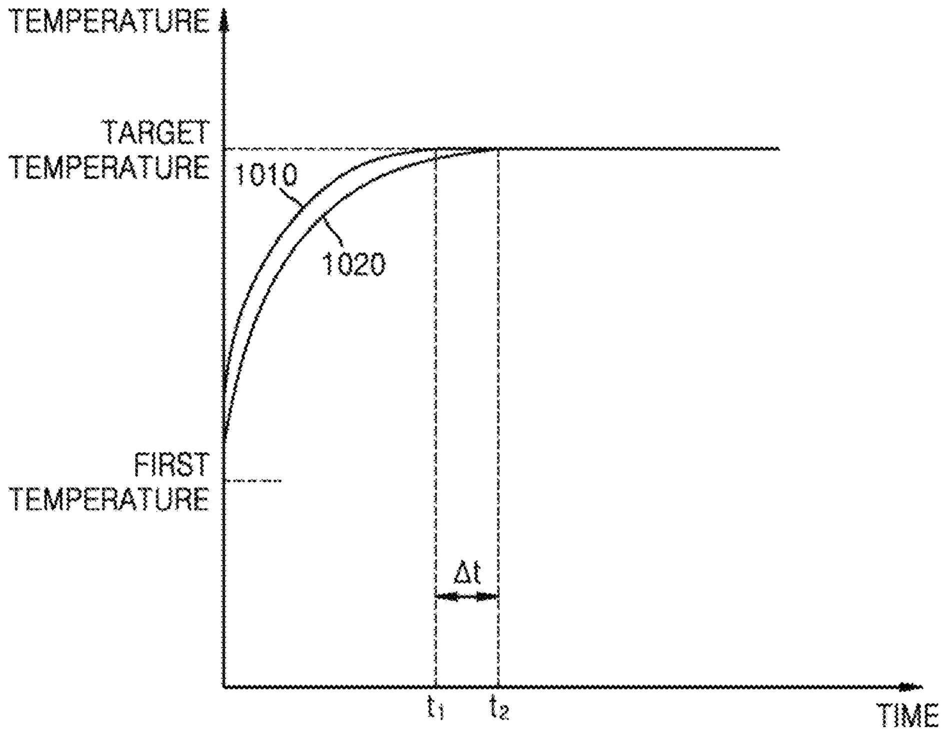
FIG. 10 is a graph illustrating a deviation in a target temperature reaching time when an initial temperature of a heater is higher than or equal to a first temperature.

FIG. 10 is a graph illustrating a deviation in the target temperature reaching time when the initial temperature of the heater is higher than or equal to the first temperature.

Referring to FIG. 10, a first graph 1010 and a second graph 1020 are illustrated. The first graph 1010 and the second graph 1020 show results of the heating operation that starts before the high temperature of the heater drops to room temperature after the previous heating operation. The first graph 1010 and the second graph 1020 show results of the heating operation performed by the aerosol generating device in different environments. For example, the first graph 1010 may have a higher initial temperature than the second graph 1020 because the heating operation started within a short period of time after the previous heating operation has finished.

Even when power is supplied to the heater according to the same profile, the target temperature reaching time may differ depending on the initial temperature of the heater. As shown in FIG. 10, the target temperature reaching time $t_1$ of the first graph 1010 with the higher initial temperature may be earlier than the target temperature reaching time $t_2$ according to the second graph 1020. Therefore, due to a difference in the initial temperature, a difference $\Delta t$ may occur in the target temperature reaching time.

If a deviation occurs in the preheating time whenever the initial temperature of the heater changes, the user may not be provided with a uniform smoking experience. The aerosol generating device 100 in FIG. 7 may provide a more uniform preheating time (or the target temperature reaching time) regardless of the initial temperature of the heater by applying the second delay time to the heating operation using the heater.

Figure 11:
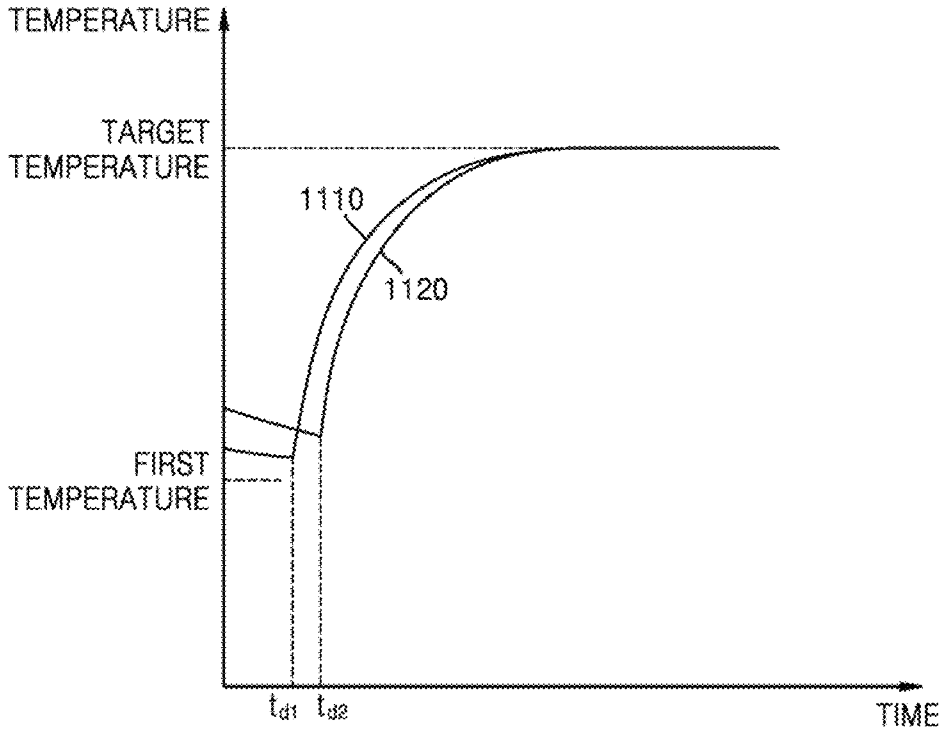
FIG. 11 is a graph illustrating an operating method of an aerosol generating device according to an embodiment when an initial temperature of a heater is higher than or equal to a first temperature.

FIG. 11 is a graph illustrating an operating method of an aerosol generating device according to an embodiment when the initial temperature of the heater is higher than or equal to the first temperature.

Referring to FIG. 11, a first graph 1110 and a second graph 1120 are illustrated. The first graph 1110 of FIG. 11 shows a result of the heating operation performed in the same environment as in the first graph 1010 of FIG. 10, and the second graph 1120 of FIG. 11 shows a result of the heating operation performed in the same environment as in the second graph 1020 of FIG. 10. For example, the first graph 1110 of FIG. 11 may show a result of the heating operation performed at the same initial temperature as in the first graph 1010 of FIG. 10.

As shown in FIG. 11, the processor may perform the heating operation after the second delay time to or to when the initial temperature of the heater is measured to be greater than or equal to the first temperature. If the initial temperature of the heater is higher than or equal to the first temperature, the processor may start the heating operation when the second delay time has passed from when the initial temperature of the heater is measured or from when a user input for the heating operation is received (e.g., when insertion of the aerosol generating article is detected). The target temperature reaching times and the difference between the target temperature reaching times may vary according to a length of the second delay time. The second delay time may set to an appropriate time such that the difference between the target temperature reaching times is reduced and the target temperature reaching times are not significantly increased.

The processor may determine the second delay time based on the initial temperature of the heater. The second delay time may have a positive correlation with the initial temperature of the heater. In other words, as the initial temperature of the heater becomes higher, the second delay time may be increased such that the difference between the target temperature reaching times is minimized.

As shown in FIG. 11, the second delay time to of the first graph 1110 having a lower initial temperature may be shorter than the second delay time $t_{d2}$ of the second graph 1120. Because the heating operation for the first graph 1110 showing a lower initial temperature is initiated earlier than the second graph 1120, the difference between target temperature reaching times may be reduced compared to that of FIG. 10.

Figure 12:
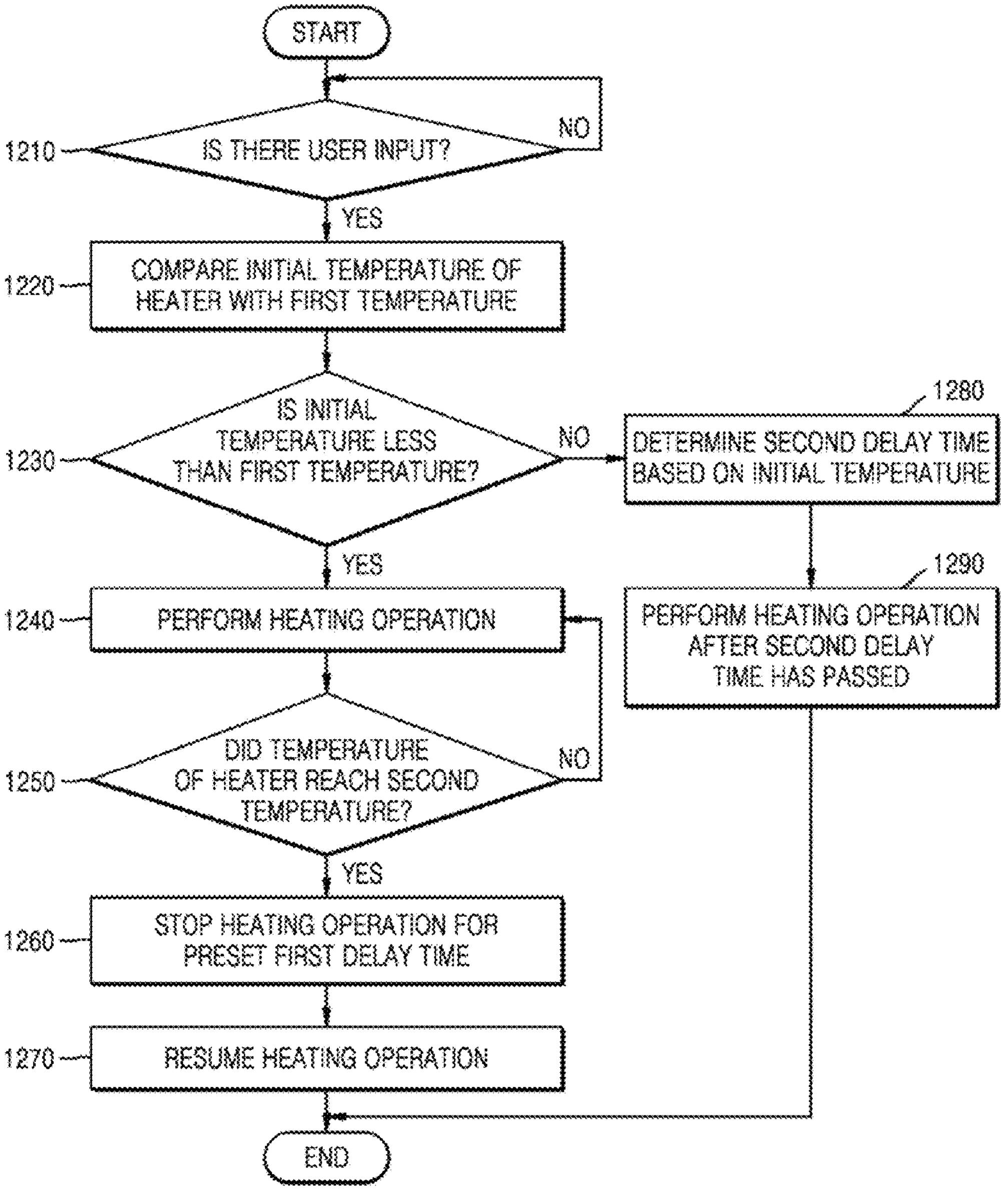
FIG. 12 is a flowchart an operating method of an aerosol generating device, according to an embodiment.

FIG. 12 is a flowchart illustrating an operating method of an aerosol generating device according to an embodiment.

Referring to FIG. 12, the operating method of an aerosol generating device according to an embodiment includes the operations that are processed in the aerosol generating device 100 shown in FIG. 7. Therefore, it can be seen that the descriptions above with respect to the aerosol generating device 100 shown in FIG. 7 may also apply to the operating method of the aerosol generating device of FIG. 12, even if omitted below.

In operation 1210, the aerosol generating device may determine whether a user input is received. When it is determined that the user input is not received, the aerosol generating device may wait until the user input is received. For example, the aerosol generating device may repeatedly perform operation 1210 according to a preset period. When it is determined that the user input is received, the aerosol generating device may perform operation 1220. The user input may include pressing of a button, touching of a touch screen, detecting an insertion of an aerosol generating article, or the like.

In operation 1220, the aerosol generating device may, by using the temperature sensor, measure the initial temperature of the heater, which is the temperature when the user input is received. Also, the aerosol generating device may compare the initial temperature of the heater with the first temperature.

In operation 1230, the aerosol generating device may determine whether the initial temperature of the heater is lower than the first temperature. The aerosol generating device may perform operation 1240 when the initial temperature of the heater is lower than the first temperature, and may perform operation 1280 when the initial temperature of the heater is higher than or equal to the first temperature.

In operation 1240, the aerosol generating device may perform the heating operation using the heater. The aerosol generating device may perform the heating operation using the heater immediately when the initial temperature of the heater is measured to be lower than the first temperature.

In operation 1250, the aerosol generating device may determine whether the temperature of the heater has reached the second temperature. The aerosol generating device may measure the temperature of the heater heated in real time by using the temperature sensor. The aerosol generating device may perform operation 1260 when the temperature of the heater reaches the second temperature.

In operation 1260, the aerosol generating device may stop the heating operation for a preset first delay time. For example, the first delay time may be a time preset considering at least one of performance of the heater, power supplied to the heater, the target temperature of the heater, and the target temperature reaching time of the heater.

In operation 1270, the aerosol generating device may resume the heating operation when the first delay time has expired after the heating operation was stopped in operation 1260. The aerosol generating device may, by applying the first delay time to the heating operation, provide a uniform preheating time (or target temperature reaching time) even when the aerosol generating device is used in different external environments or when different aerosol generating articles are used.

In operation 1280, the aerosol generating device may determine the second delay time based on the initial temperature of the heater. The aerosol generating device may determine the second delay time having a positive correlation with the initial temperature of the heater. When the initial temperature of the heater is measured to be higher than or equal to the first temperature, unlike in operation 1240, the aerosol generating device may not perform the heating operation immediately and wait until the second delay time passes.

In operation 1290, the aerosol generating device may perform the heating operation after the second delay time has passed. The aerosol generating device may, by applying the second delay time to the heating operation, provide a uniform preheating time (or target temperature reaching time) even when the initial temperature of the heater is different.

Figure 13:
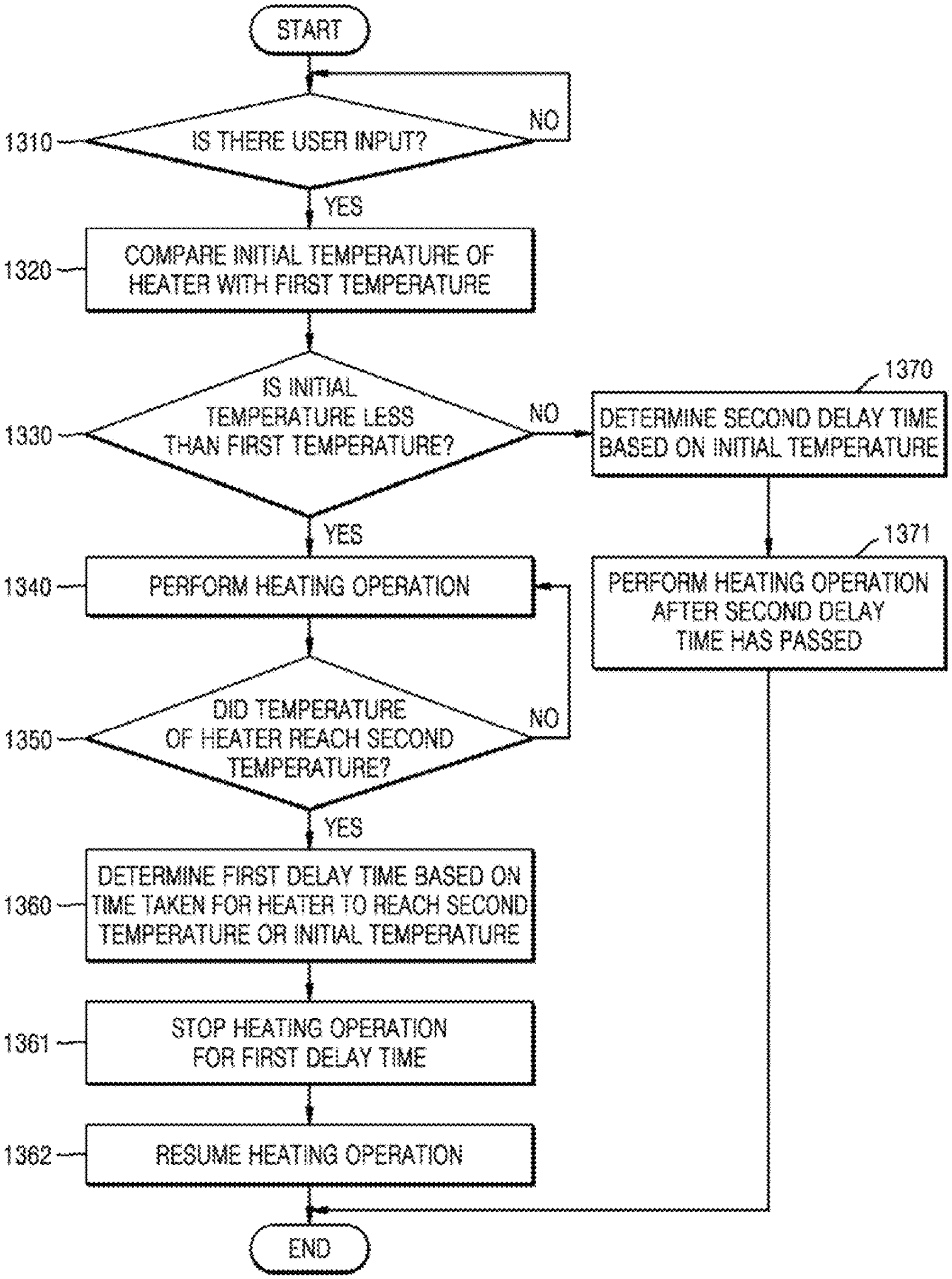
FIG. 13 is a flowchart illustrating an operating method of an aerosol generating device, according to another embodiment.

FIG. 13 is a flowchart illustrating an operating method of an aerosol generating device according to an embodiment.

Referring to FIG. 13, the operating method of the aerosol generating device according to another embodiment includes the operations that are processed in the aerosol generating device 100 shown in FIG. 7. Therefore, it can be seen that the descriptions above with respect to the aerosol generating device 100 shown in FIG. 7 may also apply to the operating method of the aerosol generating device of FIG. 13, and even if omitted below.

Operations 1310 to 1350 and 1370 to 1371 of FIG. 13 may respectively correspond to operations 1210 to 1250 and 1280 to 1290 of FIG. 12. Accordingly, redundant descriptions thereof are omitted. In the embodiment shown in FIG. 13, contrary to FIG. 12, the first delay time is determined in real time based on the initial temperature of the heater or the time taken for the heater to reach the second temperature (see S1360).

In operation 1310, the aerosol generating device may determine whether the user input is received.

In operation 1320, the aerosol generating device may compare the initial temperature of the heater with the first temperature.

In operation 1330, the aerosol generating device may determine whether the initial temperature of the heater is lower than the first temperature. The aerosol generating device may perform operation 1340 when the initial temperature of the heater is lower than the first temperature, and may perform operation 1370 when the initial temperature of the heater is higher than or equal to the first temperature.

In operation 1340, the aerosol generating device may perform the heating operation using the heater.

In operation 1350, the aerosol generating device may determine whether the temperature of the heater has reached the second temperature. The aerosol generating device may perform operation 1360 when the temperature of the heater reaches the second temperature.

In operation 1360, the aerosol generating device may determine the first delay time based on the initial temperature of the heater or the time taken for the heater to reach the second temperature.

In an embodiment, the aerosol generating device may determine the first delay time having a negative correlation with the time taken for the temperature of the heater to reach the second temperature. In another embodiment, the aerosol generating device may determine the first delay time having a positive correlation with the initial temperature of the heater.

In operation 1361, the aerosol generating device may stop the heating operation for the first delay time.

In operation 1362, the aerosol generating device may resume the heating operation after the first delay time has passed. The aerosol generating device may determine the first delay time based on a heating speed of the heater or the initial temperature of the heater, thereby providing uniform preheating time (i.e., target temperature reaching time) even when the aerosol generating device is used in different external environments or when different aerosol generating articles are used.

In operation 1370, the aerosol generating device may determine the second delay time based on the initial temperature of the heater.

In operation 1371, the aerosol generating device may perform the heating operation after the second delay time has passed.

Figure 14:
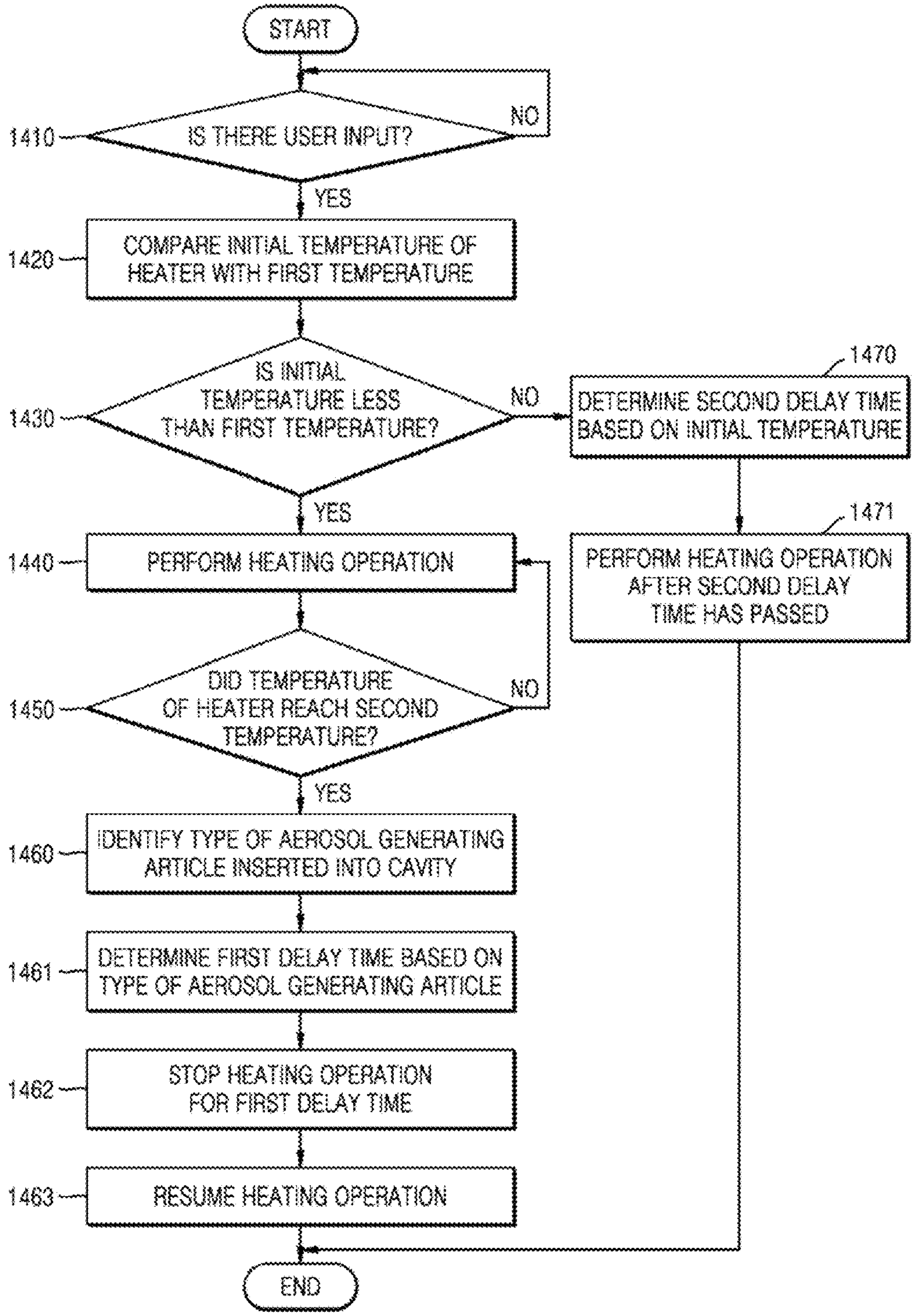
FIG. 14 is a flowchart illustrating an operating method of an aerosol generating device, according to another embodiment.

FIG. 14 is a flowchart illustrating an operating method of an aerosol generating device according to another embodiment.

Referring to FIG. 14, the operating method of the aerosol generating device according to another embodiment includes the operations that are processed in the aerosol generating device 100 shown in FIG. 7. Therefore, it can be seen that the descriptions above with respect to the aerosol generating device 100 shown in FIG. 7 may also apply to the operating method of the aerosol generating device of FIG. 14, and even if omitted below.

Operations 1410 to 1450 and 1470 to 1471 of FIG. 14 may respectively correspond to operations 1210 to 1250 and 1280 to 1290 of FIG. 12. Accordingly, redundant descriptions thereof are omitted.

In operation 1410, the aerosol generating device may determine whether the user input is received.

In operation 1420, the aerosol generating device may compare the temperature of the heater with the first temperature.

In operation 1430, the aerosol generating device may determine whether the initial temperature of the heater is lower than the first temperature. The aerosol generating device may perform operation 1440 when the initial temperature of the heater is lower than the first temperature, and may perform operation 1470 when the initial temperature of the heater is higher than or equal to the first temperature.

In operation 1440, the aerosol generating device may perform the heating operation using the heater.

In operation 1450, the aerosol generating device may determine whether the temperature of the heater has reached the second temperature. The aerosol generating device may perform operation 1460 when the temperature of the heater reaches the second temperature.

In operation 1460, the aerosol generating device may identify the type of the aerosol generating article inserted into the cavity. The aerosol generating device may identify the type of the aerosol generating article by recognizing the identification mark of the aerosol generating article by using the identification sensor.

In operation 1461, the aerosol generating device may determine the first delay time based on the type of the identified aerosol generating article. The aerosol generating device may determine the first delay time corresponding to the type of the identified aerosol generating article from among various first delay times stored in the memory.

In operation 1462, the aerosol generating device may stop the heating operation for the first delay time.

In operation 1463, the aerosol generating device may resume the heating operation after the first delay time has passed. The aerosol generating device may determine the first delay time based on the type of the aerosol generating article, thereby providing uniform preheating time (i.e., target temperature reaching time) even when the aerosol generating device is used in different external environments or when different aerosol generating articles are used.

In operation 1470, the aerosol generating device may determine the second delay time based on the initial temperature of the heater.

In operation 1471, the aerosol generating device may perform the heating operation after the second delay time has passed.

According to embodiments, the operations shown in FIG. 14 may be performed in a different order. For example, operations 1460 and 1461 may be performed before the temperature of the heater reaches the second temperature in operation 1450.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules, or other data. The communication medium typically includes computer-readable instructions, data structures, other data in modulated data signals such as program modules, or other transmission mechanisms, and includes any information transfer media. Those of ordinary skill in the art related to the present embodiments may understand that various changes in form and details can be made therein without departing from the scope of the characteristics described above. The disclosed methods should be considered in a descriptive sense only and not for purposes of limitation. The scope of the disclosure should be defined by the appended claims, and all differences within the scope equivalent to those described in the claims will be construed as being included in the scope of protection defined by the claims.

The invention claimed is:

1. An aerosol generating device comprising:

a heater configured to heat an aerosol generating article;

a temperature sensor configured to measure a temperature of the heater; and a processor configured to:

obtain an initial temperature of the heater which is measured by the temperature sensor when a user input for starting a heating operation of the heater is received;

compare the initial temperature of the heater with a first temperature;

based on the initial temperature being lower than the first temperature, control the heater to perform the heating operation according to a preset temperature profile;

when the heater is heated to a second temperature higher than the first temperature, control the heater to stop the heating operation for a first delay time; and determine the first delay time based on a time taken for the heater to be heated from the initial temperature to the second temperature.

2. The aerosol generating device of claim 1, wherein the first delay time has a negative correlation with the time taken.

3. The aerosol generating device of claim 1, wherein the processor is further configured to, if the initial temperature is higher than or equal to the first temperature, determine a second delay time based on the initial temperature, and control the heater to perform the heating operation after the second delay time has passed.

4. The aerosol generating device of claim 3, wherein the second delay time has a positive correlation with the initial temperature of the heater.

5. The aerosol generating device of claim 1, further comprising:

a cavity configured to accommodate the aerosol generating article; and an insertion detecting sensor configured to detect whether the aerosol generating article is inserted into the cavity, wherein the processor is further configured to start the heating operation when the insertion detecting sensor detects that the aerosol generating article is inserted into the cavity.

6. The aerosol generating device of claim 1, further comprising:

a cavity configured to accommodate the aerosol generating article, wherein the heater comprises:

a coil surrounding the cavity and configured to generate a variable magnetic field; and a susceptor located inside the coil and configured to be heated by the variable magnetic field, and wherein the processor is further configured to control the heater to perform or stop the heating operation by controlling power supplied to the coil.

7. The aerosol generating device of claim 6, wherein while the heating operation is stopped during the first delay time, the susceptor continues to conduct heat to the aerosol generating article by a residual eddy current induced from the variable magnetic field.

* * * * *